Patented Jan. 1, 1952

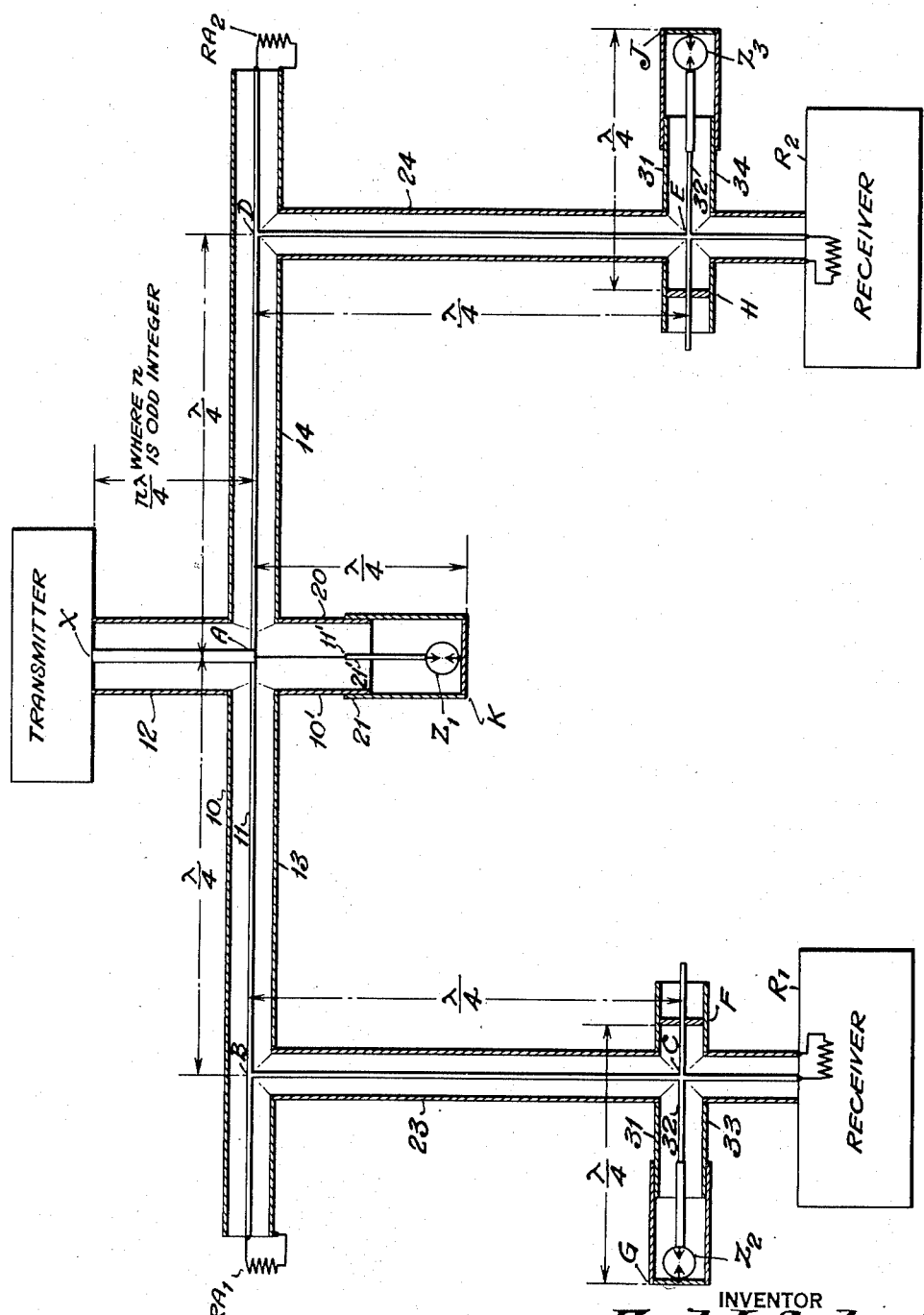

2,580,389

UNITED STATES PATENT OFFICE 2,580,389

ANTENNA FILTER

Earl I. Anderson, Manhasset, N. Y., assignor to Radio Corporation of America, a corporation of Delaware Application November 20, 1942, Serial No. 466,274

10 Claims. (Cl. 250—13)

1

The present invention relates to high frequency filter systems for connecting one or more transmitters and receivers to a common antenna system and, more particularly, to such systems for use in pulse transmitting and receiving systems for non-signalling purposes.

An object of the present invention is the provision of a filter system for enabling the connection of one or more transmitters and receivers to common antenna system without requiring the use of mechanical switching.

Another object of the present invention is the provision of a filter network, the operating characteristics of which are controlled by the power applied thereto.

A further object of the present invention is the provision of a filter system for pulse transmitting and receiving systems.

Still another object of the present invention is to provide a pulse radio system adapted to transmit radiant energy pulses on two antennas from a common transmitter and to receive on separate receivers incoming pulses from each of the antennas individually.

Still a further object of the present invention is the provision of an antenna filter system for pulse transmitting and receiving equipment which utilizes no moving parts or mechanical switches for diverting the outgoing and incoming pulses to the appropriate transducer equipment.

The foregoing objects, and others which may appear from the following detailed description, are attained in accordance with the principles of the present invention by providing a filter system between a pair of antennas, a pair of receivers and a transmitter, which utilizes a plurality of concentric line sections acting as filter elements. The filter elements are so placed and have electrical discontinuities therein so located that when signalling potentials are applied to the system from the transmitter the electrical discontinuities are caused to break down and become conducting. The filter sections then act to conduct the energy from the transmitter to the two antennas but prevent its application to the receivers. When the transmitter ceases operation the electrical discontinuities are restored and the signals picked up by each antenna are applied to one of the receivers.

Other filter sections similar to those described above are so arranged as to cause the transmitter to appear as a high impedance to the received signals so that they are not dissipated in the transmitter circuits.

2

The filter system, as so far described, is designed for use with a radio system for determining the drift of an airplane with respect to the ground. Without some such system for determining the drift of a plane, and if a crosswind is blowing, the airplane may be sent off its true course and thus may become lost. In cases of heavy fog or overcast conditions the heretofore known optical systems for determining cross-wind and drift are unuseable. It is therefore desirable to use radio drift indicating systems which operate regardless of weather conditions. Generally, a radio drift indication system includes structure for transmitting a pair of sharply directive beams of radiant energy to earth, or to the surface of the sea below, along directions normal to the course of the plane and means for receiving and detecting the reflected energy. Any sidewise drift of the plane will cause a Doppler effect on the received frequencies and by measuring the Doppler effect an indication of the drift is obtained.

The novel features which, it is believed, are characteristic of the present invention are pointed out with particularly in the appended claims.

The invention will, however, be more completely understood by reference to the following detailed description which is accompanied by a drawing illustrating an embodiment of the filter system for separating the transmitted and received impulses.

In the single figure of the drawing there is shown a transmitter X connected by means of concentric transmission line 12 to a pair of branch lines 13 and 14, one of which is associated with each of the antennas symbolically indicated by resistors $RA_1$ and $RA_2$. $RA_1$ is connected by other concentric transmission line sections 23 to receiver $R_1$ and antenna $RA_2$ is similarly connected by line 24 to receiver $R_2$. All of the concentric transmission lines are, in general, similarly constructed, each including an outer tubular sheath 10 and an inner conductor 11. The transmission line 12 from the transmitter X at point A branches into the two branch lines 13 and 14, one of which is connected to each of the antennas $RA_1$ and $RA_2$. Also at point A is connected a filter section 20 constructed like the other transmission lines of an outer shell 10' and a concentrically arranged central conductor 11' and having an electrical length adjustable to one quarter of the operating wavelength. Trombone slide joints 21 and 21' in each of the conductors may be used for adjusting the length of the section, as is well known. The end of shell 10' is closed by a plate K and the inner conductor 11' connected therethrough variable impedance $Z_1$. At intermediate points B and D along transmission lines 13 and 14, spaced from junction point A a distance equal to a quarter wavelength at the operating frequency, are connected branch transmission lines 23 and 24 by means of which receivers $R_1$ and $R_2$ are connected to the antennas $RA_1$ and $RA_2$, respectively. At points C and E along each of the transmission lines 23 and 24, spaced from their junctions B and D with lines 13 and 14 by a distance equal to a quarter wavelength, are filter sections 33 and 34. Sections 33 and 34 are similar to filter 20, each being closed at the end remote from the connection with lines 23 and 24, respectively, by end plates G and J. Impedance elements $Z_2$ and $Z_3$ are provided to connect between the inner conductors 32 and outer shells 31 as in the case of filter element 20. These impedance elements may be spark gaps or they may be gas discharge tubes. It is only essential that below certain applied potentials they are open circuits or pure reactances and that an increase of potential above this limit causes the tubes to ionize or break down or "fire" and act as a low impedance connection between the inner conductor and outer shell of each of the filter elements. The lengths AB, AD, BC and DE are each electrically equal to one quarter wavelength at the operating frequency. The surge impedances of lines 23 and 24 are equal to the surge impedances of lines 13 and 14. The electrical length AK of transmitter filter section 20, the length GF of the filter section 33 and the length HJ of filter section 34 are, likewise, each electrically equal to one quarter wavelength at the operating frequency though their actual mechanical lengths are somewhat shorter than a physical quarter wavelength because these elements are loaded by the capacitive reactance of elements $Z_1$, $Z_2$ and $Z_3$, which may amount to a value of the order of 1.3 micromicrofarads. In filter network elements 33 and 34 the inner conductors 32 are arranged to be connected to the associated outer conductor 31 by slidable bridges F and H so that the distances CF and EH may be adjusted. Thus by separately adjusting slide F and the trombone slide joint in filter section 35 the length FG may be made equal to a quarter wavelength and then by adjusting slide F and the trombone slide joint simultaneously in the same direction the tapping point C may be effectively moved along conductor 32. Filter section 34 may be similarly adjusted. By this means the lengths CF and EH may be adjusted to a minimum which will insure maximum voltage transfer to receivers $R_1$ and $R_2$.

The operation of the filter system is as follows. When the transmitter fires, impedance element $Z_1$ will ionize and appear as a low impedance and thus the input impedance to filter section 20 at point A will be high and the energy will flow toward antennas $RA_1$ and $RA_2$. The voltage will also build up across filter sections 33 and 34 causing impedance elements $Z_2$ and $Z_3$ to ionize thus placing a very low impedance at points C and D which, in turn, causes a high input impedance for the signalling energy for sections 23 and 24 to appear at points B and D. Thus the major portion of the transmitter power will be applied to antennas $RA_1$ and $RA_2$. With the cessation of the transmitted impulse all of the impedance elements $Z_1$, $Z_2$ and $Z_3$ de-ionize and the system is ready to receive the returning pulse.

When the impedance element $Z_1$ is not ionized line 20 is effectively open at point K and appears therefore as a short circuit at point A. Thus there is a very severe impedance mismatch between points B and D of transmission lines 13 and 14. Filter sections 33 and 34 being open at G and J appear as high impedances at points C and E. Thus energy from the antenna $RA_1$ flows to receiver $R_1$ and energy from antenna $RA_2$ flows to receiver $R_2$ but the cross coupling between the two receivers is very small. The energy at receiver $R_2$ from antenna $RA_1$ and at receiver $R_1$ from $RA_2$ is several hundred times less than that at receiver $R_2$ from $RA_2$ and at receiver $R_1$ from $RA_1$. The surge impedance of filter section 20 must be high compared with that of the balance of the filter for the power dissipation in impedance element $Z_1$ to be a minimum. Furthermore, the transmission line 12 from transmitter X to point A is preferably an odd number of quarter waves in length and the transmitter output circuit is designed to have a high "Q" so that it reflects a high impedance into the transmission line 12. Due to the high impedance at transmitter X an odd number of quarter waves away from point K an additional low impedance will appear across the transmission line at point A thus increasing the mismatch between points B and D and further increasing the isolation between them.

While I have referred to various line sections as having an electrical length equal to a quarter wavelength, it should be clearly understood that any odd multiple of this length may be used, but economy of materials and space will generally dictate the use of the shortest possible length.

While I have illustrated a particular embodiment of the present invention it should be clearly understood that the invention is not limited thereto since many modifications may be made in the several elements employed and in their arrangement and it is therefore contemplated by the appended claims to cover any such modifications as fall within the spirit and scope of the invention.

I claim:

1. A radio system including an antenna, a receiver and a transmitter, a transmission line connecting said transmitter and said antenna, a branch transmission line connected between said first mentioned line and said receiver, filter elements connected across said transmission lines at distances equal to one quarter of the operating wavelength from their junction, each of said filter elements having electrical discontinuities therein and so arranged that energy picked up by said antenna is applied to said receiver only, said filter elements being further so arranged that when said electrical discontinuities are closed energy from said transmitter is applied to said antenna only.

2. A radio system, including an antenna, a receiver and a transmitter, a transmission line connecting said transmitter and said antenna, a branch transmission line connected across said first transmission line, filter elements connected across each of said transmission lines at distances equal to one quarter of the operating wavelength from their junction, said transmitter being connected to said first transmission line at the point of connection of the filter element associated therewith, each of said filter elements having electrical discontinuities therein and so arranged that energy picked up by said antenna is applied to said receiver only, said filter elements being further so arranged that when said electrical discontinuities are closed energy from said transmitter is applied to said antenna only.

3. A radio system, including an antenna, a receiver and a transmitter, a first transmission line connected to said antenna, a branch transmission line connected between said first mentioned transmission line and said receiver, a quarter wave line section closed at one end and open at the other end whereby its impedance is high and having an intermediate point along its length connected to said second transmission line at a distance equal to one quarter of the operating wavelength from its junction with said first transmission line, a second quarter wave line section having one end connected to said first transmission line at a point distant a quarter of the operating wavelength from said junction, said transmitter being coupled to said first transmission line at said point, and means for closing the other ends of said line sections whereby said first line section prevents flow of energy along the branch transmission line and whereby said second line section permits the flow of energy along said first transmission line section.

4. A radio system, including an antenna, a receiver and a transmitter, a first transmission line connected to said antenna, a branch transmission line connected between said first mentioned transmission line and said receiver, a quarter wave line section closed at one end and open at the other end whereby its impedance is high and having an intermediate point along its length connected to said transmission line at a distance equal to one quarter of the operating wavelength from its junction with said first transmission line, a second quarter wave line section having one end connected to said first transmission line at a point distant a quarter of the operating wavelength from said junction, said transmitter being coupled to said first transmission line at said point, and means for closing the other ends of said line sections whereby said first line section prevents flow of energy along the branch transmission line and whereby said second line section permits the flow of energy along said first transmission line section, said last mentioned means including impedance elements having a resistance varying inversely with respect to potentials applied thereacross.

5. A radio system, including an antenna, a receiver and a transmitter, a first transmission line connected to said antenna, a branch transmission line connected between said first mentioned transmission line and said receiver, a quarter wave line section closed at one end and open at the other end whereby its impedance is high and having an intermediate point along its length connected to said second transmission line at a distance equal to one quarter of the operating wavelength from its junction with said first transmission line, a second quarter wave line section having one end connected to said first transmission line at a point distant a quarter of the operating wavelength from said junction, said transmitter being coupled to said first transmission line at said point, and discharge paths connected across the other ends of said line sections and so arranged that said first line section prevents flow of energy along the branch transmission line and so that said second line section permits the flow of energy along said first transmission line in the presence of applied potentials sufficient to cause a discharge across said discharge paths.

6. A radio pulse system, including a pair of antennas, a first transmission line connecting said antennas, a transmitter coupled to said first transmission line at its midpoint, branch transmission lines connected to said first lines at distances equal to one quarter of the operating wavelength to each side of said midpoint, a receiver associated with each of said transmission lines, a quarter wave line section connected at one end across said first transmission line at its midpoint, further quarter wave line sections each closed at one end and each connected at an intermediate point across said branch transmission lines at distances equal to one quarter of the operating wavelength from their junction with their first line, said line sections being normally electrically discontinuous at their other ends, and means for bridging said electrical discontinuities.

7. A radio pulse system, including a pair of antennas, a first transmission line connecting said antennas, a transmitter coupled to said first transmission line at its midpoint, branch transmission lines connected to said first lines at distances equal to one quarter of the operating wavelength to each side of said midpoint, a receiver associated with each of said transmission lines, a quarter wave line section connected at one end across said first transmission line at its midpoint, further quarter wave line sections each closed at one end and each connected at an intermediate point across said branch transmission lines at distances equal to one quarter of the operating wavelength from their junction with their first line, said line sections being normally electrically discontinuous at their other ends, and means for connecting across said other ends in response to applied potentials above a predetermined value.

8. A radio pulse system, including a pair of antennas, a first transmission line connecting said antennas, a transmitter coupled to said first transmission line at its midpoint, branch transmission lines connected to said first lines at distances equal to one quarter of the operating wavelength to each side of said midpoint, a receiver associated with each of said transmission lines, a quarter wave line section connected at one end across said first transmission line at its midpoint, further quarter wave line sections each closed at one end and each connected at an intermediate point across said branch transmission lines at distances equal to one quarter of the operating wavelength from their junction with their first line, and discharge paths connected across the other ends of said line sections and so arranged that said first line section prevents the flow of energy along said first transmission line and said further line sections prevent the flow of energy from said first transmission line to said receiver in presence of applied potentials sufficient to cause a discharge across said discharge paths.

9. A radio system including an antenna, a receiver, and a transmitter, a transmission line connecting said transmitter and said antenna, a branch transmission line connected between said first mentioned line and said receiver, filter elements coupled to said transmission lines at distances equal to a small odd multiple of a quarter wavelength from their effective junction at the operating wavelength, each of said filter elements having electrical discontinuities therein and so arranged that energy picked up by said antenna is applied to said receiver only, said filter elements being further so arranged that when said electrical discontinuities are closed energy from said transmitter is applied to said antenna only.

10. A radio system including an antenna, a receiver, and a transmitter, a transmission line connecting said transmitter and said antenna, a branch transmission line connected between said first mentioned line and said receiver, filter elements coupled to said transmission lines at distances equal to a small odd multiple of a quarter wavelength from their effective junction at the operating wavelength, each of said filter elements comprising a gas discharge tube having therewithin a spark gap, and so arranged that energy picked up by said antenna is applied to said receiver only, and further so arranged that when said transmitter is operative energy therefrom short-circuits said spark gaps to close said spark gap and said energy from said transmitter is applied susbtantially to said antenna only.

EARL I. ANDERSON.

REFERENCES CITED

The following references are of record in the file of this patent:

UNITED STATES PATENTS

| Number | Name | Date |
|---|---|---|
| 972,004 | Marriott | Oct. 4, 1910 |
| 1,035,958 | Girardeau | Aug. 20, 1912 |
| 2,189,549 | Hershberger | Feb. 6, 1940 |
| 2,201,199 | Peterson | May 21, 1940 |
| 2,219,922 | Gossel | Oct. 29, 1940 |
| 2,220,922 | Trevor | Nov. 12, 1940 |
| 2,223,049 | Reichle | Nov. 26, 1940 |
| 2,235,010 | Chaffee | Mar. 18, 1941 |

FOREIGN PATENTS

| Number | Country | Date |
|---|---|---|
| 358,917 | Great Britain | Oct. 14, 1931 |